2,995,500
SEPARATION PROCESS OF AQUEOUS PYRIDINE MIXTURES

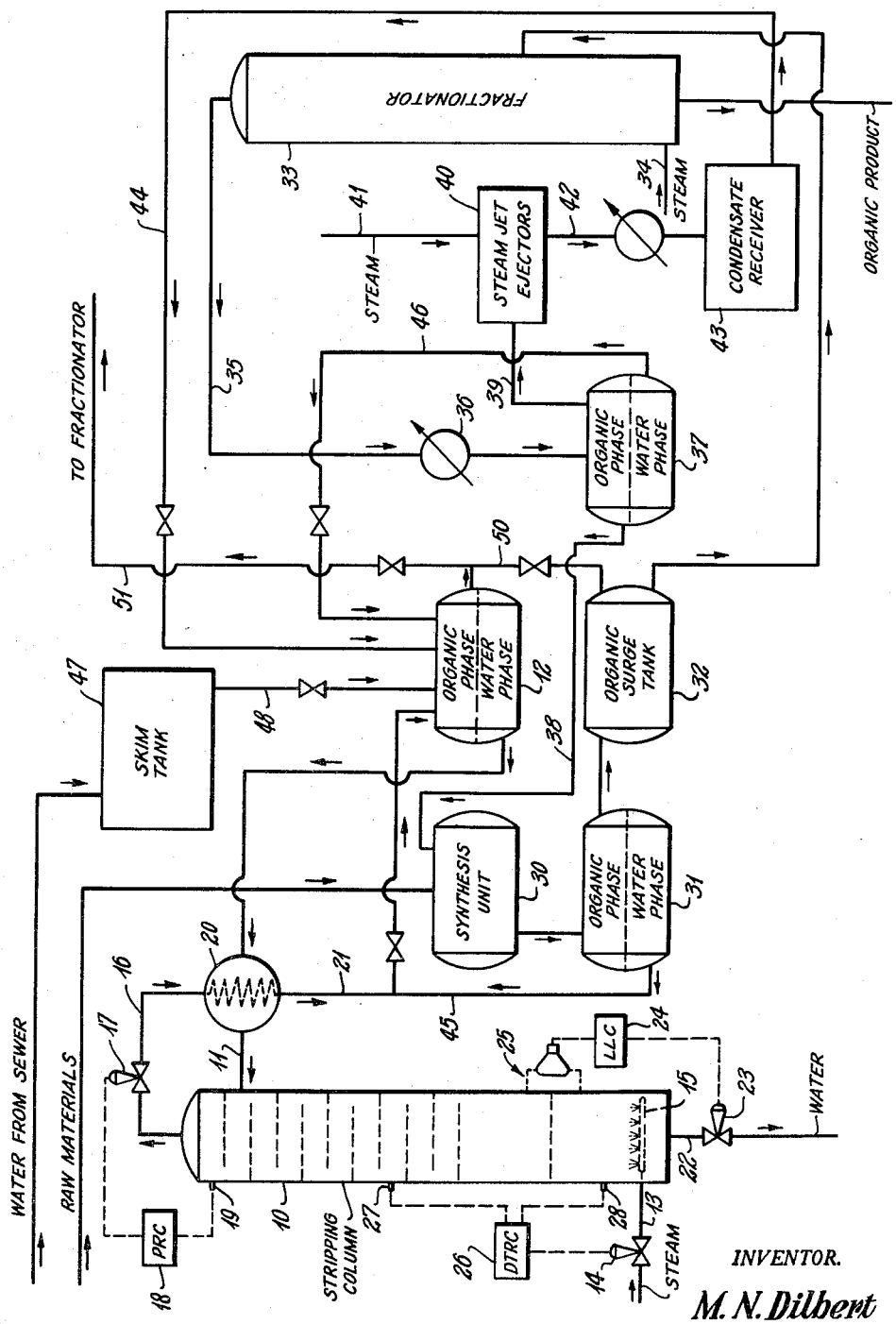

Meredith N. Dilbert, Pasadena, Tex., assignor to Phillips Petroleum Company, a corporation of Delaware
Filed Dec. 28, 1953, Ser. No. 400,530
7 Claims. (Cl. 202—42)

This invention relates to a method of and apparatus for stripping close boiling materials. In a more specific aspect, it relates to a method of stripping organic pyridine materials from water streams containing them in residual amounts. In still another aspect, it relates to a novel synthesis and fractionating system with means for recovering organic materials from water streams present in the synthesis and fractionation units.

In the operation of fractionation columns, particularly where the boiling range of the components to be separated is small, the usual methods of column control may have a very narrow range of satisfactory operation, particularly when the column is operated at or near its full capacity. Under such circumstances, slight changes in the feed rate, feed temperature, or column pressure ordinarily require a manual resetting of the amount of heat supplied to the column to prevent upsetting of the column or flooding.

This is particularly true where residual amounts of pyridine materials such as 2-methyl-5-ethylpyridine and 2-methyl-5-vinylpyridine, are to be stripped from water streams containing them. Under the pressure conditions requisite for satisfactory operation, there is less than a 10° F. difference in boiling point between the water on the one hand and the pyridine material-water azeotrope on the other hand. This requires very careful control of the supply of stripping steam to the column. Thus, if the steam rate is too small, even to a slight degree, the amount of valuable pyridine materials present in the water kettle product is excessive, and if the steam rate is slightly too high, flooding of the column may occur. In accordance with this invention, the column is automatically controlled to provide, at all times, the optimum steam rate consistent with maximum recovery of the valuable pyridine materials without flooding of the column. In one installation, adoption of the present control system in a methylvinylpyridine plant resulted in a decrease in loss of methylethylpyridine from 80,000 pounds per month to 17,000 pounds per month.

In another aspect, the novel fractionation control system cooperates with other elements of a plant where a synthesis reaction such as the dehydrogenation of 2-methyl-5-ethylpyridine to 2-methyl-5-vinylpyridine takes place in the presence of steam, the material synthesized being subsequently fractionated to provide a methylvinylpyridine product together with a recycle methylethylpyridine product. The latter distillation is best carried out in the presence of steam. The water added to the system during the dehydrogenation and fractionation steps is separated from the organic materials by phase separation.

With many organic materials, and particularly pyridine materials, a substantial economic value is represented by the residual pyridine remaining in the water separated from the organic material. Accordingly, it is a feature of this invention that the organic materials are efficiently removed from the separated water, the novel separation system of the invention thereby cooperating with the synthesis and fractionation units to provide a maximum recovery of the valuable pyridine materials.

It is an object of the invention to provide a novel control system for a stripping column, particularly where the column separates components having close boiling points under the fractionation conditions.

It is a further object to provide an improved method of and apparatus for recovery of valuable organic materials from water streams present in organic synthesis and separation units.

It is a still further object to accomplish the foregoing purposes with a minimum of standard equipment, and with a high degree of efficiency.

Various other objects, advantages and features of the invention will become apparent from the following detailed description taken in conjunction with the accompanying drawing, in which:

The figure is a flow diagram of a typical organic synthesis and fractionation system embodying the novel fractionation unit of this invention.

Referring now to the drawing in detail, I provide a stripping column 10, feed being supplied to the top of the column through a line 11 from a secondary separator unit 12, the function of which will be hereinafter described in detail. The column feed is the water phase from separator 12, and this water stream contains residual amounts of valuable organic materials. In a typical plant operation, the feed contains about 1.5 to 3.5 percent of organic pyridine materials, principally 2-methyl-5-ethylpyridine and 2-methyl-5-vinylpyridine. Picolines, and other vinylpyridines and alkylpyridines, may be present in amounts of 0 to 30 percent by weight of the total organics; usually about 20 percent.

The term "pyridine materials" as used herein includes, in addition to pyridine itself, alkyl, vinyl and alkyl substituted vinyl heterocyclic nitrogen compounds in which the ring structure is unsaturated, partially saturated, or completely saturated, including but not limited to alkyl, vinyl, and alkyl substituted vinylquinolines, isoquinolines, piperidines (hexahydropyridines), pyrroles, pyrrolidines, pyrrolidones, dihydro and tetrahydropyridines, partially hydrogenated quinolines, isoquinolines, and pyrrolines (dihydropyrroles). Vinyl or alkyl substituents can be attached to a ring carbon atom or, where the ring nitrogen atom is a secondary nitrogen atom, the substituent group can be attached to this ring nitrogen atom as, for example, in N-vinylcarbazole and N-vinylpyrrolidone.

In the column 10, suitable conditions of temperature and pressure are maintained for the separation of the pyridine material as an azeotrope from the water. In the example noted, where the feed stream is principally water containing 2-methyl-5-ethylpyridine and 2-methyl-5-vinylpyridine, a pressure of approximately 20 pounds per square inch gauge and a temperature of 250° F. can be maintained at the top of the column with a bottom temperature of 256° F. The top and bottom temperatures will, of course, vary with pressure but, at all practical operating pressures, the difference in boiling point between the azeotrope and the water is less than 10° F. In a typical plant installation, feed is passed to the column at the rate of 42 gallons per minute with variations from 35 to 60 gallons per minute, and the stripping column is 30 inches in diameter, 25 feet long, and contains 10 bubble cap trays spaced at 2 foot intervals proceeding from the top of the column. The size of the column, and nature of the separating unit within the column, i.e., bubble cap trays or packing materials such as Berl saddles, will vary depending upon the particular feed into the column and the amount of feed stock to be handled.

The aforesaid operating conditions are maintained by supplying steam to the bottom or kettle of the column through a steam line 13 incorporating an automatic control valve 14, the steam flowing through a distributor unit 15 into the bottom of the column. Under the typical conditions outlined above, 30 pound steam can be used and it enters the column, therefore, at a temperature of about 275° F., the steam rate varying between 3500 and 5000 pounds per hour.

The overhead product from the column is withdrawn through an effluent conduit 16 incorporating an automatic control valve 17. This valve is actuated by a pressure recorded controller 18 having a tap or pressure sensing unit 19 at the upper end of the column. The action of controller 18 and valve 17 is to maintain a substantially constant pressure at the top of the column. However, in practice, minor variations in pressure occur despite the control action of unit 18 with the result that the column pressure may, at intervals, increase or decrease 1 or 2 pounds per square inch. Due to the small temperature differential between the top and bottom of the column, such minor pressure fluctuations produce substantial variations in composition at constant temperature. As will be hereinafter pointed out in detail, it is a major purpose of this invention to maintain optimum operation of the column despite such minor fluctuations in pressure.

The material passing through conduit 16 flows through a condenser 20 wherein it is condensed from the vapor to the liquid state, the resulting overhead product consisting of 15 to 20 percent organic material and water which is returned to the organic phase in secondary separator 12 by a line 21. It will be noted that the feed material passes in indirect heat exchange relation with the effluent in condenser 20 so that the heat given up by the condensing material is transferred to the feed and raises its temperature to a proper level for introduction into the column 10. The feed temperature is therefore partially dependent upon the overhead rate at constant pressure.

A liquid level is maintained, as indicated, at the bottom of column 10 by control of the amount of water withdrawn as bottoms product through a line 22. To this end, line 22 incorporates an automatic control valve 23 which is actuated by a liquid level controller 24 having a level sensing unit 25 communicating with the kettle of the column. The action of controller 24 is to maintain a constant level of water within the kettle by movement of valve 23 which controls the water withdrawal rate.

In accordance with the invention, the flow of steam into the column is regulated by a differential temperature controller 26 operatively connected to valve 14 and having a pair of temperature sensing elements or taps 27 and 28 located at two vertically-spaced regions within the fractionation zone. Preferably and advantageously, element 28 is located in the kettle, and element 27 is immersed in the liquid on an intermediate tray of the column. Temperature sensing elements 27 and 28 should be of a type which are quickly responsive to small temperature changes, and are preferably not encased within a well or other housing which might shield the sensing element from the fluid whose temperature is to be measured.

The differential temperature controller enables optimum conditions of steam flow through the column to be maintained at all times despite the aforesaid minor fluctuations in pressure resulting from the operation of controller 18 or feed temperature fluctuations due to the change in the overhead product rate.

In order to fully appreciate the advantages of the combined action of differential temperature controller 26 and pressure controller 18, two cases should be considered. In the first case, it is desired to operate stripping unit 10 at conditions of maximum throughput. With an ordinary control system, the steam rate would be adjusted to maintain a constant temperature at a selected tray in the column, and this temperature would be set to provide maximum throughput through the column at the operating pressure. Under such circumstances, it is clear that a small pressure decrease, resulting from a momentary upset in the operation of the pressure maintenance system, might cause a momentary fall in temperature at the indicating point without a corresponding composition change with the result that additional steam would be fed to the column and flooding would occur with a resulting extended upset in column operation. With the described control system, however, such a momentary change in pressure affects both control points equally so that no increase in steam rate occurs responsive to such a pressure variation. Thus, flooding of the column is avoided.

The described action of the differential temperature controller is quite important in the operation of the column where the temperature difference between opposite ends is small, as the effect of minor variations in pressure is thereby considerably accentuated. The effect of such variations in pressure in causing flooding of the column is eliminated by utilizing the differential temperature controller of my invention in combination with the pressure controller. Similarly, the effect of variations in feed temperature in causing flooding or upset of the column is eliminated.

It is advantageous to locate the lower sensing element 28 in the kettle where the material present is substantially pure water and, hence, of essentially constant composition. The upper sensing element 27 is best located several trays above the kettle and several trays below the feed inlet so that it is not affected unduly by changes in feed composition or temperature. The effect of this arrangement is to insure that the descending organic material shall have a constant composition independent of minor pressure fluctuations when it reaches element 27, this composition being so chosen that all the remaining organic material can be readily stripped out on the trays below element 27, thereby insuring that substantially no organic material reaches the kettle and is discarded with the kettle product. The steam rate is varied only as the feed rate or composition, or feed temperature is changed, resulting in a composition and, hence, temperature change at element 27 without a corresponding change at element 28. In practice, where the column 10 is heavily loaded, the trays between elements 27, 28 can be adjusted to operate, under normal pressure conditions, at 95 percent of their maximum load. This allows a 5 percent margin for control purposes to compensate for any incipient flooding condition at the top part of the column resulting from pressure fluctuations.

In the second case, if the column capacity is ample to handle all rates of flow of feed, the differential temperature control cooperates with pressure controller 18 to provide only the proper amount of steam to yield a kettle product of the desired purity, despite minor fluctuations in pressure produced in the operation of controller 18.

Referring again to the drawing, I shall now describe the cooperation of the fractionation system with other elements of an organic synthesis and separation unit. From the figure, it will be noted that raw materials are fed to a synthesis unit 30 wherein a mixture of organic materials and water is produced. One synthesis unit to which the invention is particularly applicable is the dehydrogenation of 2-methyl-5-ethylpyridine to 2-methyl-5-vinylpyridine in the presence of steam. The effluent from synthesis unit 30 is fed to a primary separator 31 wherein an organic phase is separated from a water phase. The water phase in separator 31 contains a substantial proportion of organic material which is recovered in the manner hereinafter described.

The organic phase from separator 31 flows to a surge tank 32 and, thence, to a fractionating column 33 wherein the organic mixture is separated into its components. The separation of 2-methyl-5-vinylpyridine from 2-methyl-5-ethylpyridine, the fractionation is conducted in the presence of steam admitted through a line 34 and under vacuum. One organic product, for example, 2-methyl-5-vinylpyridine, is withdrawn from the bottom of fractionation column 33 while a mixture of water and another component, for example, 2-methyl-5-ethylpyridine, is withdrawn overhead through line 35 and passed to a condenser 36 wherein the vaporous overhead is condensed, the condensate flowing to a settling zone 37 where an organic phase separates from a water phase. The organic phase can be advantageously recycled to the synthesis unit 30 by a line 38 or it can be sent to a by-products fractionator.

As stated, the separation in column 33 is carried out under vacuum. To this end, a line 39 from separator 37 is connected to a steam jet ejector 40 supplied with steam by a line 41 and equipped with a steam outlet 42. The operation of the steam jet provides a vacuum which extends to separator 37, condenser 36, and fractionation column 33.

The condensate from the ejector unit 40 has been found to contain organic materials in recoverable portions. Accordingly, this condensate is transferred from a receiver 43 to the secondary separator 12 by a line 44. Similarly, the water phase from primary separators 31 and 37 is fed to the secondary separator 12 through the respective lines 45 and 46.

It has also been found that the ground water from the fractionation and synthesis area contains organic materials, such as pyridine materials, in recoverable proportions. This ground water is collected and fed to a skim tank 47 from which it passes through a line 48 to secondary separator 12. In the skim tank, solid materials which are lighter than the water can be removed or, alternatively, the entire quantity of ground water can flow through line 48 to the secondary separator 12.

In the secondary separator, a further phase separation takes place forming an organic layer and a water layer containing residual amounts of pyridine materials. As previously indicated, the water layer is fed to stripping column 10 where the pyridine materials are stripped therefrom and returned to the separator 12. In effect, therefore, stripping unit 10 removes water from the system without removing any appreciable amount of organic material, and this water, due to its low organic content, is suitable for direct use in other plant equipment.

The organic layer from secondary separator 12 is either passed through a line 50 to surge tank 32 or through a line 51 to a fractionator wherein it is separated into various pyridine material fractions, such as 2-methyl-5-ethyl-pyridine, 2-methyl-5-vinylpyridine, picolines, and the like.

It will be evident that I have provided a system for substantially complete recovery of valuable organic materials from water streams in organic synthesis and separation units. As one element thereof, this combination utilizes a fractionation unit or stripper embodying a novel control system compensating for minor pressure fluctuations in the column without danger of flooding or excessive use of stripping steam in the column.

While the invention has been described in connection with a present, preferred embodiment thereof, it is to be understood that this description is illustrative only and is not intended to limit the invention.

I claim:

1. In a process wherein 2-methyl-5-vinylpyridine is separated from 2-methyl-5-ethylpyridine by steam distillation, the method for recovering said pyridines from water which comprises fractionating said mixture in the presence of steam to produce an overhead product containing 2-methyl-5-ethylpyridine and water together with a bottoms product containing 2-methyl-5-vinylpyridine, condensing the overhead stream and allowing it to settle, thereby forming an organic phase and a water phase, condensing steam in a zone communicating with the separation zone to maintain a reduced pressure upon the separation zone and fractionation zone, feeding said water phase to a secondary separation zone wherein an organic layer separates from a water layer, feeding the condensate from said steam condensing step to said secondary separation zone, fractionating said water layer to separate water from an azeotrope of water and residual organic material, returning said azeotrope to the secondary separation zone, and recovering the organic layer.

2. In a process wherein 2-methyl-5-ethylpyridine is dehydrogenated in the presence of steam to form 2-methyl-5-vinylpyridine, the steps which comprise allowing the effluent from the dehydrogenation step to settle, thereby forming an organic phase and a water phase, recovering the organic phase, passing the water phase to a secondary separation zone wherein it separates to form an organic layer and a water layer, fractionating the water layer to separate water from an azeotrope of water and residual organic material, returning the residual organic material to the secondary separation zone, and recovering said organic layer.

3. The process for separating 2-methyl-5-ethylpyridine from 2-methyl-5-vinylpyridine which comprises introducing a stream containing said compounds as two components thereof into a fractionation zone, maintaining a pressure within the fractionation zone which is substantially constant but subject to minor fluctuations, maintaining the lower end of the zone at the temperature of boiling of the higher boiling of said components under said pressure, maintaining the upper end of said zone at a temperature equal to the boiling point of the lower boiling of said components at said pressure, introducing steam to the fractionation zone to supply heat thereto and strip the lower boiling component from the mixture of close boiling components, determining the temperature at two vertically-spaced regions within the fractionation zone, controlling the amount of steam fed to the column in accordance with the temperature differential between said regions to maintain said differential at a predetermined value, withdrawing the higher boiling component from the bottom of the fractionation zone, and withdrawing the lower boiling component from the top of said fractionation zone.

4. The process for separating close boiling materials where there is less than 10° F. difference in boiling point between two components to be separated which comprises introducing the materials to be separated into a fractionation zone, said close boiling materials being selected from the group consisting of pyridine, alkyl, vinyl, and alkyl substituted vinyl heterocyclic nitrogen compounds, maintaining a pressure within the fractionation zone which is substantially constant but subject to minor fluctuations, maintaining the lower end of the zone at the temperature of boiling of the higher boiling of said components under said pressure, maintaining the upper end of said zone at a temperature equal to the boiling point of the lower boiling of said components at said pressure, introducing steam to the fractionation zone to supply heat thereto and strip the lower boiling component from the mixture of close boiling components, determining the temperature at two vertically-spaced regions within the fractionation zone, controlling the amount of steam fed to the column in accordance with the temperature differential between said regions to maintain said differential at a predetermined value, withdrawing the higher boiling component from the bottom of the fractionation zone, and withdrawing the lower boiling component from the top of said fractionation zone.

5. A method for recovering organic material consisting principally of 2-methyl-5-ethylpyridine and 2-methyl-5-vinylpyridine together with other vinylpyridines and alkylpyridines in the amount of 0 to 30 percent by weight based on the total organics from water in a process wherein said organic material is fractionated in the presence of steam which comprises fractionating said organic material in the presence of steam to provide first and second organic products, one of which incorporates substantially all the water present in the fractionation zone, allowing the organic stream incorporating the water to settle and thereby form an organic phase and a water phase, recovering the organic phase, introducing the water phase into a secondary settling zone wherein an organic layer separates from a water layer, fractionating said water layer to separate the water from residual organic material contained therein, withdrawing the separated organic material and feeding it to said secondary settling zone, and recovering said organic layer.

6. In a process wherein saturated pyridine materials selected from the group consisting of pyridine, and alkyl substituted heterocyclic nitrogen compounds are dehydrogenated in the presence of steam to form unsaturated pyridine materials selected from the group consisting of vinyl and alkyl substituted vinyl heterocyclic nitrogen compounds, the steps which comprise allowing the effluent from the dehydrogenation step to settle, thereby forming an organic phase and a water phase, recovering the organic phase, passing the water phase to a secondary separation zone wherein it separates to form an organic layer, and a water layer, fractionating the water layer to separate water from an azeotrope of water and residual organic material, returning the residual organic material to the secondary separation zone, and recovering said organic layer.

7. The process of separating an unsaturated pyridine material consisting essentially of 2-methyl-5-vinylpyridine from an aqueous stream containing such material which comprises introducing said aqueous stream to a phase separation zone wherein a water phase and a lighter organic phase containing pyridine material consisting essentially of 2-methyl-5-ethylpyridine and 2-methyl-5-vinylpyridine are formed, stripping the water phase to recover residual pyridines therefrom, fractionating the organic phase in the presence of steam to provide a bottoms product of 2 methyl-5-vinylpyridine substantially free from water and an overhead product of 2-methyl-5-ethylpyridine containing residual water present in said organic phase, recovering said bottoms product, and returning the overhead product to said phase separation zone.

References Cited in the file of this patent
UNITED STATES PATENTS

| | | |
|---|---|---|
| 1,290,124 | Downs | Jan. 7, 1919 |
| 1,416,206 | Huff | May 16, 1922 |
| 1,673,374 | Peters | June 12, 1928 |
| 1,942,446 | Peterkin | Jan. 9, 1934 |
| 2,022,809 | Kramer | Dec. 3, 1935 |
| 2,058,435 | Fisher | Oct. 27, 1936 |
| 2,086,808 | Kallam | July 13, 1937 |
| 2,276,089 | Ragatz | Mar. 10, 1942 |
| 2,383,176 | Willkie | Aug. 21, 1945 |
| 2,411,809 | Rupp et al. | Nov. 26, 1946 |
| 2,531,112 | Dauphine | Nov. 21, 1950 |
| 2,580,651 | Boyd | Jan. 1, 1952 |
| 2,702,784 | Rossi | Feb. 22, 1955 |
| 2,717,232 | Geller et al. | Sept. 6, 1955 |
| 2,723,940 | Fenske et al. | Nov. 15, 1955 |

OTHER REFERENCES

Coulson and Jones—Studies in Coal Tar Bases I, June 1946 (pages 169–175 relied on). (Copy in Scientific Library.)

Petroleum Refiner, vol. 27, No. 11, Nov. 1948 (pages 114 and 115 relied on). (Copy in Scientific Library.)